July 30, 1935.  J. GREWE  2,009,920
CONTROL VALVE ASSEMBLY FOR FLUID FLOW GUNS
Filed Feb. 20, 1933
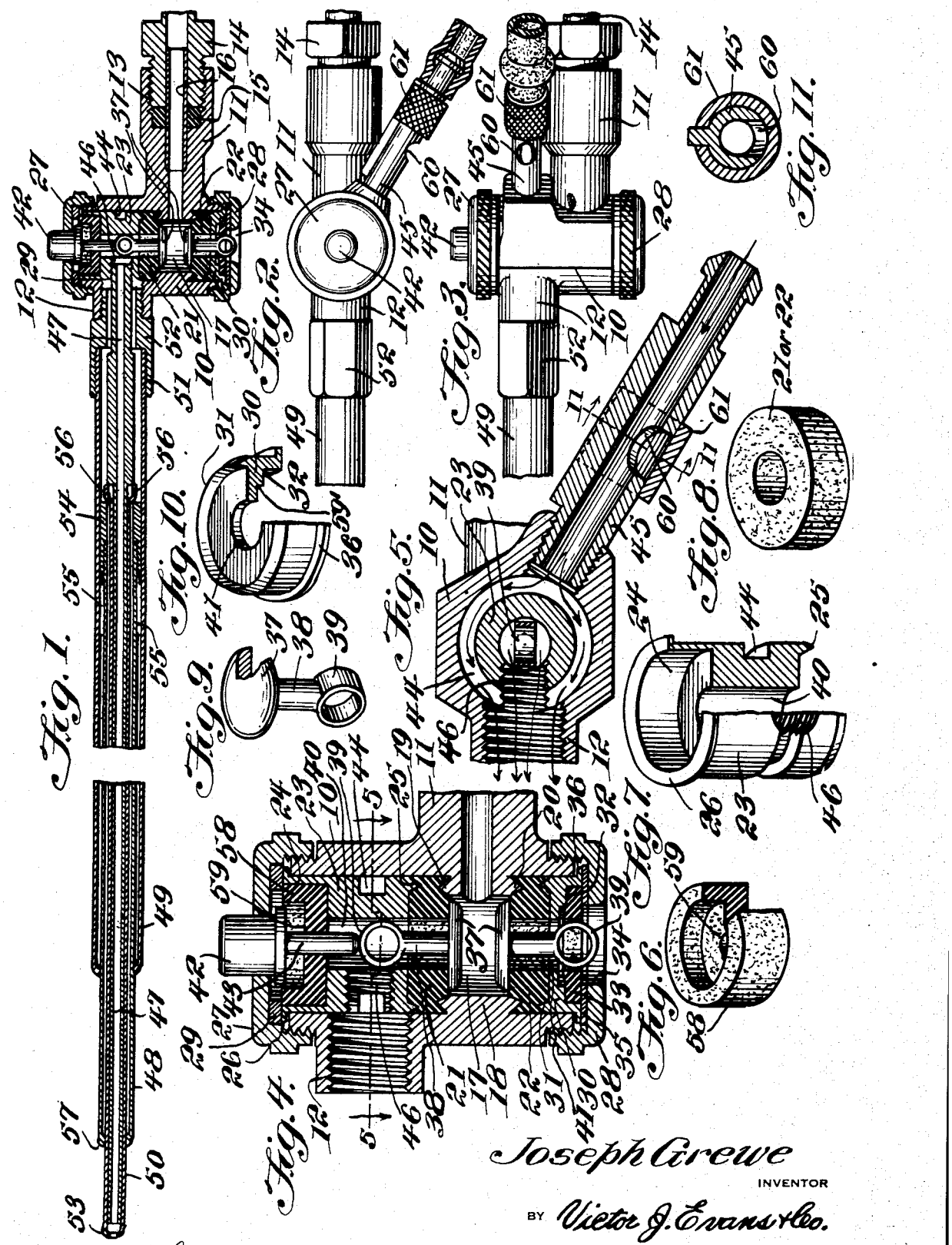
Joseph Grewe
INVENTOR
BY Victor J. Evans & Co.
ATTORNEY Patented July 30, 1935

2,009,920

UNITED STATES PATENT OFFICE 2,009,920

CONTROL VALVE ASSEMBLY FOR FLUID FLOW GUNS

Joseph Grewe, Hartwell, Ohio

Application February 20, 1933, Serial No. 657,737

2 Claims. (Cl. 251—156)

The invention relates to a fluid flow gun and more especially to a control valve assembly for spray guns.

An object of the invention is the provision of a device of this character, wherein the valve mechanism is of novel construction and novel assembly, as the parts of such mechanism are readily accessible and in their assembly will assure perfect working of the same, the seats for the valves being mounted in a novel manner to assure positive seating action and to minimize wear thereon, as well as avoiding leakage at the valves.

A further object of the invention is the provision of a device of this character, wherein the valve mechanism is assembled in a compact manner and the control thereof being simple, the valves of such mechanism being automatically seated under the influence of the fluids and the air valve being manually controlled for the opening of the valve for the flow of such air.

A still further object of the invention is the provision of a device of this character, wherein the valves of the valve mechanism are of novel form to assure a positive automatic seating thereof and to minimize wear on the seats in the use of the device.

A still further object of the invention is the provision of a device of this character, wherein the controls for the flow of the air are of handy location and conveniently accessible.

A still further object of the invention is the provision of a device of this character which is extremely simple in construction, thoroughly reliable and efficient in its purposes, strong, durable, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing:

Figure 1 is a vertical longitudinal sectional view through the device constructed in accordance with the invention.

Figure 2 is a fragmentary top plan view thereof and partly in section.

Figure 3 is a side elevation of the structure shown in Figure 2.

Figure 4 is an enlarged vertical sectional view through the valve mechanism of the device.

Figure 5 is a sectional view on the line 5—5 of Figure 4 looking in the direction of the arrows.

Figure 6 is a perspective view partly broken away of one of the packings of the valve mechanism.

Figure 7 is a perspective view partly broken away of the inner fitting of the valve mechanism.

Figure 8 is a perspective view of one of the resilient valve seats.

Figure 9 is a perspective view partly broken away of one of the valves.

Figure 10 is a perspective view partly broken away of another interfitting of the valve mechanism.

Figure 11 is a sectional view on the line 11—11 of Figure 5 looking in the direction of the arrows.

Similar reference characters indicate corresponding parts throughout the several views in the drawing.

Referring to the drawing in detail, the device therein shown comprises a cylindrical shell or casing 10 for a valve mechanism, which is formed with an air inlet nipple 11 at one side and an outlet nipple 12 at the opposite side thereof. The inlet nipple 11 has an internally threaded coupling socket 13 for the reception of the coupling or connector 14 of a compressed air supply lead. The socket 13 has removably fitted therein a resilient packing or gasket 15 having a center coupling tube 16 which fits within the bore of the nipple 11 and also the bore of the connector or coupling 14 so that when the latter is detachably united with the nipple 11 there will be assured a leakproof joint therebetween.

Formed interiorly of the shell or casing 10 is a fluid chamber 17 which intermediate of its extent has present a circular shoulder 18 formed on the inner wall of said shell or casing 10 and this shoulder is provided with spaced annular knife edge ribs 19 and 20 respectively, for gripping engagement with resilient centrally perforated valve seats 21 and 22 respectively. The opposite ends of the shell or casing 10 are open and the valve seats 21 and 22 are introduced therethrough onto the ribs 19 and 20 respectively. Thus, it will be seen that should the seats 21 and 22 become unfit for use they can readily be replaced with dispatch and in a convenient manner.

Removably fitted within the shell or casing 10 and insertable through one open end thereof, to be superimposed upon the valve seat 21, is a filler plug 23 having a cupped outer end 24 and an annular knife edge ridge 25 at its inner end, the latter engaging the seat 21. The cupped end 24 is formed with an annular flange or rim 26 to overlap the open end of the casing or shell 10 and permits the convenient removal of the plug 23 from the said shell or casing. The opposite open ends of the shell or casing 10 are externally threaded for the detachable connection therewith of the caps or heads 27 and 28 respectively. The cap or head 27 fits over the plug 23 and carries a gasket 29 to impinge upon the rim or flange 26 of said plug to assure a fluid-tight closure at this end of the shell or casing.

The cap or head 28 fits over a removable cup 30 which is removably insertable in said shell or casing 10 and is formed at its inner side with an annular knife edge rib 31 to engage in the seat 22. The outer side of the cup in the circular countersink 32 therein receives a resilient centrally perforated disk 33 confronting an opening 34 in the head or cap 28, the latter being fitted with a gasket 35 contacting with the disk 33 and also with a rim or flange 36 on the cup 30 so as to effect a fluid-tight joint at this end of the shell or casing 10.

Arranged within the chamber 17 in the shell or casing 10 are floating valves, each including a head 37, center stem 38 and an eye terminal 39 to said stem. These valves are reversely set to have the heads 37 engage the respective seats 21 and 22 when in closed position, while the stems 38 thereof are disposed within the center openings 40 and 41 in the plug 23 and cup 30 respectively. Fitted centrally in the cap or head 27 is a push button 42 having a pusher extension 43 which operates upon the terminal eye 39 of the valve engageable with the seat 21. These valves are normally maintained against the seats 21 and 22 through the pressure of the fluid admitted through the nipple 11 and on pressing the button 42 the valve engaging the seat 21 can be moved therefrom to permit the fluid from the nipple 11 to pass through the outlet nipple 12 as should be obvious.

The cap or head 28, by its construction with the center opening 34, enables the device to be utilized for inflating inner tubes of tires and in this use the valve engaging the seat 22 through the eye terminal 39 contacting with the valve guts of the valve stem of the inner tube will become unseated so that air can flow through the opening 34 into the inner tube. On the release of the valve stem of the inner tube from contact with the disk 33, the valve next to the seat 22 will engage and contact therewith for the closing of this opening 34. Formed in the plug 23 externally thereof is a circular fluid way or channel 44 which opens into a connector 45 threaded into the shell or casing 10 and this connector is coupled with a liquid or water supply main or lead. The way or channel 44 also communicates with the outlet 12.

The plug 23 has formed therein a threaded opening 46 which is adapted to align with the nipple 12, the latter having attached thereto the extensible nozzle hereinafter fully described and in this description will be set forth the purpose of the threaded opening 46 in said plug.

The extensible nozzle comprises the telescopically interfitted tubular sections 47, 48 and 49 respectively, while the section 47 carries an extension sleeve 50 slidably fitted thereon. The section 49 at its inner end is externally threaded at 51 for detachable engagement in a connector 52 which is threaded into the outlet nipple 12 of the shell or casing 10 and this section 49 is the outermost member of the nozzle. The section 47 at its inner end is threaded in the opening 46 in the plug 23 so that air admitted to the chamber 17 on the opening of the valve engaging the seat 21 will flow through the opening 46 in the plug 23 and be conveyed under pressure through the tube section 47 and discharged through the contracted tip 53 of the sleeve 50. The tube section 49 engaged with the connector 52, which is engaged with the nipple 12 of the shell or casing 10, is in communication with the way or channel 44 so that liquid, such as water, delivered through the connector 45 will flow through this way or channel 44 into the tube section 49. The tube section 48 at its inner end is formed with an external collar 54 provided with split yieldable friction jaws 55, these working against the inner wall of the tube section 49 so as to prevent free sliding of the section 48 inwardly and outwardly within the section 49. The collar 54 forms a fluid-tight joint between said sections 48 and 49 and the water within the section 49 will flow through the section 48 when the latter is extended or pulled outwardly of the section 49 and the tip 53 of the sleeve 50 is inwardly with respect to the outer contracted tip 57 of said section 48. Thus the air under pressure flowing through the section 47 will create a suction in the outer portion of the section 48 beyond the tip 53 of said section 47, thus drawing the water to the outer end of said section 48 for the spraying thereof under the air pressure of section 47.

The sleeve 50 at its inner end is formed with out-struck diametrically opposed stops or nibs 56, these engaging with the collar end 54 of the section 48 to limit the projecting of the tip 53 of the sleeve 50 beyond the outer end of the section 48 and also enabling the extending of this section 48 on pulling outwardly upon the outer end or tip 53 of said sleeve 50 and in this fashion the nozzle will be extended. When the outer end or tip 53 of the sleeve 50 is extended beyond the tip 57 of the section 48 only air will be delivered through the nozzle through the tip 53 as flowing through the section 47, provided the push button 42 has been depressed to unseat the valve from the seat 21.

The cup end 24 of the plug 23 has a resilient packing 58 therein and this packing is formed with a countersunk center 59 serving as a clearance for the push button 42 when moved inwardly through the cap 27 on the shell or casing 10.

In the countersink 32 in the cup 30 is a circular space 59' for the flexing of the disk 33 on contact with a valve stem of an inner tube so as to assure a fluid-tight contact therewith, the valve in contact with the seat 22 in this instance being mechanically unseated therefrom so that air from the chamber 17 will be delivered into the valve stem of the inner tube for the inflation of such inner tube.

The connector 45 is provided with a vent 60 closed by an outer sleeve gate 61 slidably fitted on said connector and this gate is manually controlled to regulate the flow of liquid into the nozzle. On the opening of the gate 61, that is, uncovering the vent 60, the suction will be broken in the nozzle and thus the liquid supply will become void to said nozzle.

The eye terminals 39 provide air impinging surfaces to the valves so as to assure the seating of the valves against the seats 21 and 22 by the air under pressure, as no springs are employed for the seating of such valves, they being floating valves in the assembly.

What is claimed is:
1. In a device of the character described, a casing open at opposite ends and having an inlet and an outlet on opposite sides of the transverse center of said casing, caps at opposite ends of said casing, an annular shoulder interiorly of the casing between the inlet and outlet and providing a circular knife edge, a valve seat resting against said knife edge for biting engagement of the latter with said seat, a filler plug resting against one side of the valve seat and having a cupped outer end, an annular knife edge ridge on the inner end of said plug and engaging the seat next thereto, a gasket between the plug and the cap next thereto, said plug having a central opening for communication of the inlet and outlet with each other and also having an exterior fluid way leading to said outlet, fluid supply means communicating with said way, a valve coacting with said seat for closing the central opening in said plug, and a push button for operating the valve and working through one of the end caps.

2. In a device of the character described, a casing open at opposite ends and having an inlet and an outlet on opposite sides of the transverse center of said casing, caps at opposite ends of said casing, an annular shoulder interiorly of the casing between the inlet and outlet and providing a circular knife edge, a valve seat resting against said knife edge for biting engagement of the latter with said seat, a filler plug resting against one side of the valve seat and having a cupped outer end, an annular knife edge ridge on the inner end of said plug and engaging the seat next thereto, a gasket between the plug and the cap next thereto, said plug having a central opening for communication of the inlet and outlet with each other and also having an exterior fluid way leading to said outlet, fluid supply means communicating with said way, a valve coacting with said seat for closing the central opening in said plug, a push button for operating the valve and working through one of the end caps, and a resilient packing in the cupped end of said plug and having a countersunk center constituating a clearance for the push button.

JOSEPH GREWE.